United States Patent [19]

Buchele et al.

[11] 4,037,396

[45] July 26, 1977

[54] BLADE GUARD FOR ROTARY LAWN MOWERS

[75] Inventors: Wesley F. Buchele; William I. Baldwin, both of Ames, Iowa

[73] Assignee: Iowa State University Research Foundation, Inc., Ames, Iowa

[21] Appl. No.: 580,907

[22] Filed: May 27, 1975

[51] Int. Cl.² .......................................... A01D 75/20
[52] U.S. Cl. ..................................... 56/255; 56/320.1
[58] Field of Search ................. 56/255, 320.1, 320.2, 56/17.4

[56] References Cited

U.S. PATENT DOCUMENTS

| | | | |
|---|---|---|---|
| 2,200,368 | 5/1940 | Iverson | 56/320.1 |
| 3,148,490 | 9/1964 | Chadwick | 56/320.2 |
| 3,312,049 | 4/1967 | Walker | 56/255 |
| 3,481,124 | 12/1969 | Machovina | 56/17.4 X |
| 3,643,408 | 2/1972 | Kulak et al. | 56/17.4 |
| 3,715,875 | 2/1973 | Brucker | 56/17.4 X |
| 3,921,199 | 7/1976 | Buchele | 56/17.4 |

Primary Examiner—J.N. Eskovitz

Attorney, Agent, or Firm—Zarley, McKee, Thomte & Voorhees

[57] ABSTRACT

A blade guard for rotary lawn mowers comprising a support means secured to the mower cowling and having a plurality of spaced apart elongated members secured thereto which extend longitudinally in the intended direction of travel of the mower device. A guard ring is mounted on the support and extends upwardly therefrom adapted to engage the unsharpened portion of the mower blade to prevent the elongated members from being struck by the blade upon the elongated members being deflected upwardly relative to the blade. The forward ends of the elongated members have spear-like points provided thereon which are positioned in openings formed in the forward skirt portion of the cowling. A bumper guard is secured to the cowling and is positioned over the forward ends of the spear-like points. The points comb and rake the lawn while it is being mowed with the grass hairpinning over the points to cause the same to be lifted so that the loose grass rides upward and rearward as the points move forwardly relative to the grass. The grass hairpinning over the points is fed into the tip circle of the rotating blade.

7 Claims, 5 Drawing Figures

BLADE GUARD FOR ROTARY LAWN MOWERS

BACKGROUND OF THE INVENTION

The United States Public Health Service estimates that approximately 300,000 people were injured by rotary lawn mowers in 1973. More than 70 percent of these injuries were inflicted when people came into contact with the rotary blade with the remaining 30 percent of the injuries being inflicted by objects thrown by the blade.

One of the inventors herein previously devised a blade guard for rotary lawn mowers which substantially reduced the possibility of injuries to the operator and to bystanders and the instant invention represents a significant improvement in the guarding of the blade over the previous design. The raking action of the points disclosed herein improves grass cutting efficiency.

Therefore, it is a principal object of the invention to provide a safety device for a lawn mower which reduces the hazards normally connected therewith.

A further object of the invention is to provide a blade guard for rotary lawn mowers.

A further object of the invention is to provide a blade guard for rotary lawn mowers which does not objectionably reduce the efficiency of the mower.

A further object of the invention is to provide a blade guard for rotary lawn mowers which combs and rakes the lawn as it is being mowed.

A further object of the invention is to provide a blade guard for rotary lawn mowers having means thereon for preventing the objectionable accumulation of grass thereon.

A further object of the invention is to provide a blade guard for rotary lawn mowers including a plurality of forwardly extending spear-like points.

A further object of the invention is to provide a blade guard for rotary lawn mowers which is economical of manufacture, durable in use and refined in appearance.

These and other objects will be apparent to those skilled in the art.

BRIEF DESCRIPTION OF THE DRAWINGS

This invention consists in the construction, arrangements and combination of the various parts of the device, whereby the objects contemplated are attained as hereinafter more fully set forth, specifically pointed out in the claims and illustrated in the accompanying drawings, in which:

SUMMARY OF THE INVENTION

Figure 1:
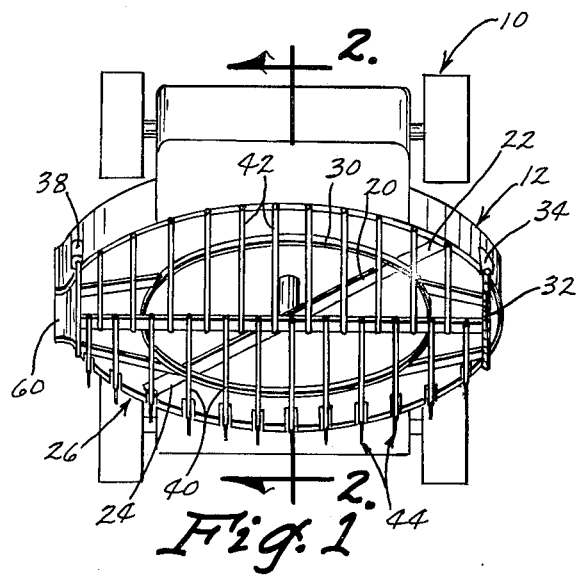
FIG. 1 is a rear bottom perspective view of the blade guard mounted on a mower.

A blade guard for a rotary lawn mower comprising a support means pivotally secured to the mower cowling and having a plurality of spaced apart elongated members which extend longitudinally in the intended direction of travel of the mower device. Spear points are mounted on the forward ends of the elongated members and have lower forward portions which dwell in a plane below that of the elongated members. A bumper guard is secured to the forward portion of the cowling and extends downwardly over the forward portion of the spear points. The rearward ends of the spear points are positioned in openings formed in the lower forward skirt of the cowling. A guard ring is mounted on the support above the elongated members and is adapted to engage the unsharpened portion of the blade to prevent the elongated member from being struck by the blade upon the elongated members being deflected upwardly relative to the blade.

DESCRIPTION OF THE PREFERRED EMBODIMENT

The numeral 10 refers generally to a conventional lawn mower generally comprising a cowling 12 having a substantially horizontally disposed lower edge 14. For purposes of description, the cowling 12 will be described as having a downwardly extending skirt portion 16 at its forward end. Blade 18 is suitably rotatably mounted on the lawn mower and is driven by any conventional power means such as an engine or the like. Blade 18 generally comprises an unsharpened center portion 20 and sharpened end portions 22 and 24.

The blade guard of this invention is referred to generally by the reference numeral 26 generally comprising a support 28 having a guard ring 30 secured thereto and extending upwardly therefrom. Support 28 includes a hinge means 32 at one side thereof which is adapted to be hingedly secured to the mower cowling 12 at 34 as illustrated in FIG. 1. Support 28 also comprises a closure means 36 at one side thereof which is adapted to be secured to the mower cowling at 38 as illustrated in FIG. 1 to maintain the blade guard 26 in its closed or operative position as desired.

Figure 4:
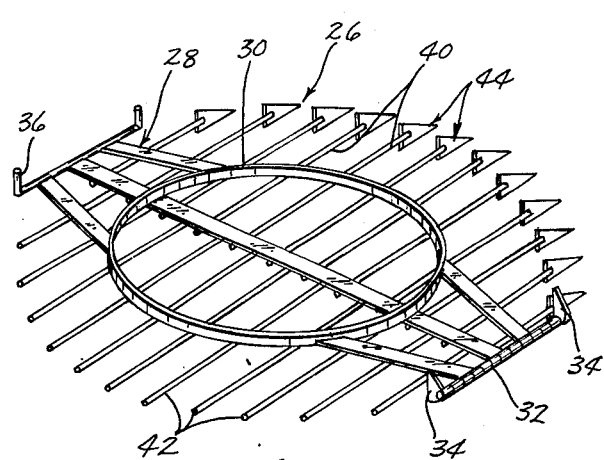
FIG. 4 is a top perspective view of the blade guard of this invention detached from the mower.

A plurality of spaced apart elongated members 40 are secured to the support 28 and guard ring 30 and extend forwardly therefrom in the intended direction of travel of the mower. A plurality of spaced apart elongated members 42 are secured to the support 28 and guard ring 30 and extend rearwardly therefrom parallel to the members 40 and being off-set with respect thereto as seen in FIG. 4.

Figure 2:
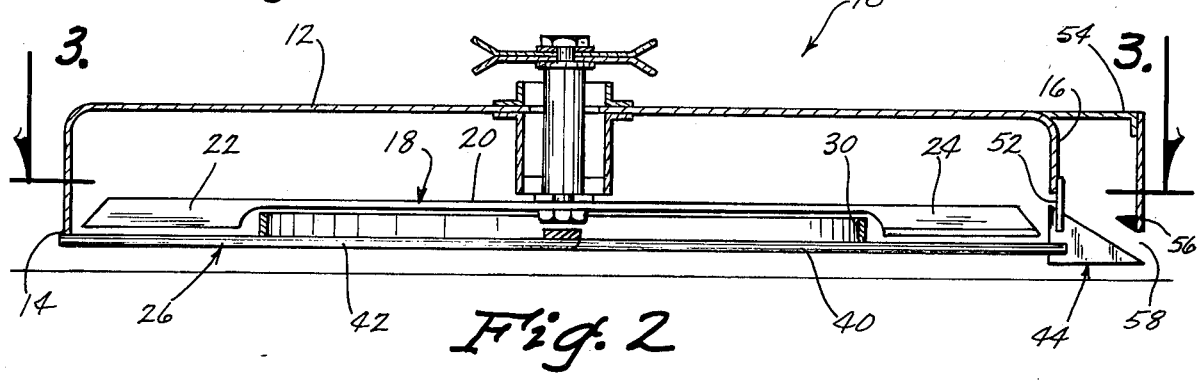
FIG. 2 is an enlarged partial sectional view seen on lines 2 — 2 of FIG. 1.
Figure 3:
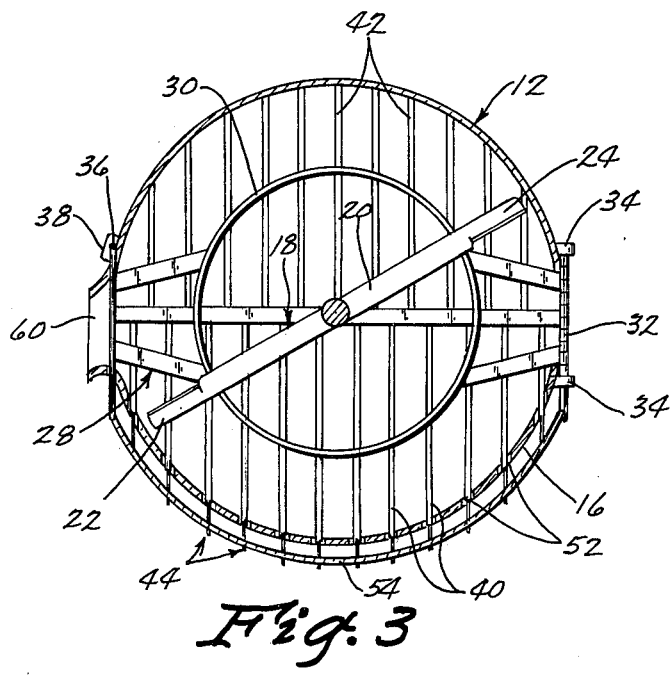
FIG. 3 is a bottom view of the mower cowling having the blade guard of this invention attached thereto.
Figure 5:
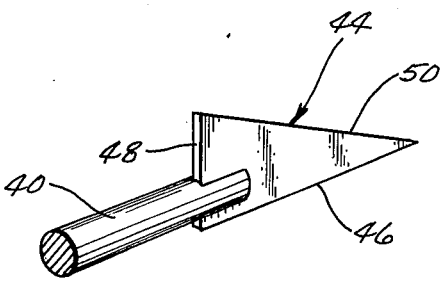
FIG. 5 is a perspective view illustrating the spear-like points provided on the forward ends of the elongated blade guard members.

Spear-like points 44 are secured to the forward ends of each of the members 40 and comprise a lower edge portion 46, vertically disposed rear edge 48 and top edge 50 which extends upwardly and rearwardly from the forward end of lower edge portion 46. Points 44 are secured to the members 40 by any convenient means such as welding or the like so that the lower edge portion 46 swells in a plane below that of the members 40. The forward skirt portion 16 of the cowling 12 is provided with a plurality of spaced apart openings 52 having the rearward ends of the points 44 positioned therein. As seen in FIG. 2, the openings 52 are formed so that the clearance exists between the upper rearward portion of the point 44 and the cowling.

While it is preferred that individual openings 52 be provided, a single wide opening may be provided in lieu thereof.

The numeral 54 refers to a bumper guard which is positioned forwardly of the forward skirt position 16 and which has a downwardly depending wall 56. As seen in FIG. 2, the lower edge of the wall 56 terminates in a spaced apart relationship with respect to the points 44 to provide a clearance therebetween generally referred to by the reference numeral 58.

The method of operation is as follows. The guard 26 is positioned on the mower to shield the rotary blade 18. Whenever the mower runs over a stone or the like, the blade guard is bent upwardly. If the force is great enough, the guard will be bent up to the point where the ring guard contacts the rotating blade in the unsharpened section. The blade will press against the ring guard and will make considerable noise but there will be no damage to the blade or to the blade guard. The blade is made of spring steel and is deflected upwardly as the blade guard is bent upwardly and thus, never strikes any portion of the blade guard. The diameter of the ring guard is slightly less than the inner diameter of the cutting edge of the blade. The cylindrical height of the ring guard is slightly less than the space between the unsharpened section of the blade and the blade guard.

As the mower is moved across the lawn, the points 44 are positioned above the round surface and tend to comb the grass as the mower is being moved along. The points not only comb the grass but lift lodged grass up so that as the grass passes through the blade guard, the grass will be cut by the mower. The grass which hairpins over the points 44 is raised upwardly and moves rearward with respect to the points as the mower is moved forwardly. The grass hairpinning over the point 44 is fed from the rear of the point 44 and falls into the tip circle of the rotating blade where it is immediately hit, cut and thrown out of the mower through the discharge chute 60. This action prevents the grass being picked up by the points 44 from hairpinning over the rear portion of the front end of the elongated members 40 and eventually moving along the member 40 until it reaches the ring guard wherein it would collect until it was removed by hand by the lawn mower operator. Thus, the grass moves upwardly and rearwardly over the points 44 and through the openings 52 where it is immediately cut by the blade to prevent undesirable lodging, plugging, clogging, etc. The bumper guard 54 protects the points 44 and prevents material from becoming imbedded on the points. As seen in the drawings, the members 40 are unsupported forwardly of the ring guard 30 which permits the grass which is lifted by the points to move in a unobstructed fashion to the tip circle of the rotating blade. If the points ride over a rock, they spring upward until they contact bumper 56 and then are not hit by the rotating blade.

If it is necessary to clean the underside of the cowling, it is simply necessary to pivotally move the guard 26 about hinge 32. Thus it can be seen that an improved blade guard has been provided for a rotary lawn mower which prevents the rotary blade from striking an object positioned therebeneath. If the mower should ride over the feet or hands of small children or the like, the blade guard should ride the feet or hands downwardly so that the toes or fingers will not protrude into the area swept by the blade tip. Not only does the blade guard prevent injury to the operator and to bystanders but the blade guard does not seriously interfere with the mowing efficiency of the mower. Thus it can been seen that the invention accomplishes at least all of its stated objectives.

We claim:
1. In a mower device,
   a wheel-supported mower cowling having an open bottom,
   a horizontal elongated cutting blade disposed within said cowling,
     said blade having sharpened cutting ends and an unsharpened center portion,
   means operatively secured to said cowling for supporting and rotating said blade,
   guard means secured to and covering the open bottom of said cowling,
     said guard means including a plurality of spaced-apart elongated members extending longitudinally in the intended direction of travel of said mower device, said elongated members having rearward and forward ends, said elongated members having pointed members at their forward ends which extend forwardly of the forward end of said cowling,
   each of said pointed members comprising a flat, vertically disposed member having a horizontally disposed lower edge portion and a top portion extending upwardly and rearwardly from the forward end of said lower edge portion,
   the forward end of said cowling having a plurality of spaced-apart openings extending upwardly from the lower edge thereof, the rearward end of said pointed members being positioned in said openings.
2. The device of claim 2 wherein the lower edge portion of each of said pointed members dwells in a plane below said elongated members.
3. The device of claim 1 wherein a bumper guard is mounted on said cowling above and forwardly of said pointed members.
4. The device of claim 2 wherein said bumper guard includes a vertically disposed portion having a lower edge positioned in a vertically spaced relationship with respect to the forward ends of said pointed members.
5. The device of claim 1 wherein the rearward ends of said pointed members are closely positioned adjacent the outer ends of said cutting ends of said blade.
6. The device of claim 3 wherein said bumper guard limits the upward movement of said pointed members upon said pointed members being deflected upwardly.
7. In a mower device,
   a wheel-supported mower cowling having an open bottom,
   a horizontal elongated cutting blade disposed within said cowling,
     said blade having sharpened cutting ends and an unsharpened center position,
   means operatively secured to said cowling for supporting and rotating said blade,
   guard means secured to and covering the open bottom of said cowling,
     said guard means including a plurality of spaced-apart elongated members extending longitudinally in the intended direction of travel of said mower device, said elongated members having rearward and forward ends, said elongated members having pointed members at their forward ends which extend forwardly of the forward end of said cowling,
   each of said pointed members comprising a flat, vertically disposed member having a horizontally disposed lower edge portion and a top portion extending upwardly and rearwardly from the forward end of said lower edge position.
   the upper rearward end of said top portion of said pointed members being vertically spaced above said elongated members.

* * * * *